US009978361B2

(12) United States Patent
Sarikaya et al.

(10) Patent No.: US 9,978,361 B2
(45) Date of Patent: May 22, 2018

(54) SYSTEMS AND METHODS FOR BUILDING STATE SPECIFIC MULTI-TURN CONTEXTUAL LANGUAGE UNDERSTANDING SYSTEMS

(71) Applicant: Microsoft Technology Licensing, LLC, Redmond, WA (US)

(72) Inventors: Ruhi Sarikaya, Redmond, WA (US); Young-Bum Kim, Fairview, WA (US); Alexandre Rochette, Montreal (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/187,263

(22) Filed: Jun. 20, 2016

(65) Prior Publication Data

US 2017/0365250 A1  Dec. 21, 2017

Related U.S. Application Data

(63) Continuation of application No. 15/185,488, filed on Jun. 17, 2016.

(51) Int. Cl.
*G06F 17/27* (2006.01)
*G10L 15/06* (2013.01)
(Continued)

(52) U.S. Cl.
CPC ........ *G10L 15/063* (2013.01); *G06F 17/2775* (2013.01); *G06F 17/28* (2013.01); *G10L 15/1822* (2013.01); *G10L 15/22* (2013.01)

(58) Field of Classification Search
CPC ....................................................... G06F 17/02

USPC ........................... 704/1, 9, 10, 257, 270–275
See application file for complete search history.

(56) References Cited

U.S. PATENT DOCUMENTS 6,219,643 B1   4/2001 Cohen et al.
6,418,440 B1   7/2002 Kuo et al.
(Continued)

OTHER PUBLICATIONS

"Deep Learning for Chatbots, Part 1—Introduction", Available at: http://www.wildml.com/2016/04/deep-learning-for-chatbots-part-1-introduction/, Apr. 6, 2016, 8 pages.
(Continued)

*Primary Examiner* — Jesse Pullias

(57) ABSTRACT

Systems and methods for building a dialog-state specific multi-turn contextual language understanding system are provided. More specifically, the systems and methods infer or are configured to infer a state-specific schema and/or state-specific rules from a formed single-shot language understanding model and/or a single-shot rule set. As such, the systems and methods only require the information necessary to form a single-shot language understanding model and/or a single-shot rule set from a builder to form or build the dialog-state specific multi-turn contextual language understanding system. Accordingly, the systems and methods for building a dialog-state specific multi-turn contextual language understanding system reduce the expertise, time, and resources necessary to build a dialog-state specific multi-turn contextual language understanding system for an application when compared to systems and methods that require further input from the builder than necessary to build a single-shot language understanding system.

20 Claims, 13 Drawing Sheets

(51) Int. Cl.
*G06F 17/28* (2006.01)
*G10L 15/22* (2006.01)
*G10L 15/18* (2013.01)

(56) References Cited

U.S. PATENT DOCUMENTS

| | | | |
|---|---|---|---|
| 8,676,583 B2 | 3/2014 | Gupta et al. | |
| 2003/0121026 A1* | 6/2003 | Wang | G06F 17/271 717/124 |
| 2003/0204404 A1* | 10/2003 | Weldon | H04M 3/493 704/270.1 |
| 2003/0225825 A1 | 12/2003 | Healey et al. | |
| 2006/0074631 A1 | 4/2006 | Wang et al. | |
| 2008/0010069 A1 | 1/2008 | Katariya et al. | |
| 2008/0306743 A1* | 12/2008 | Di Fabbrizio | G10L 15/22 704/275 |
| 2009/0055165 A1* | 2/2009 | Jindal | G06F 17/2881 704/9 |
| 2014/0122083 A1 | 5/2014 | Xiaojiang | |
| 2015/0142704 A1 | 5/2015 | London | |
| 2015/0178371 A1 | 6/2015 | Seth et al. | |
| 2015/0340033 A1 | 11/2015 | Di Fabbrizio et al. | |
| 2016/0154792 A1 | 6/2016 | Sarikaya et al. | |
| 2017/0364505 A1 | 12/2017 | Sarikaya et al. | |

OTHER PUBLICATIONS

Woudenberg, A.F. Van, "A Chatbot Dialogue Manager", In Thesis of Open University of the Netherlands, Jun. 17, 2014, 132 pages.
Liu, et al., "Natural Language Understanding for Partial Queries", In Proceedings of IEEE Automatic Speech Recognition and Understanding Workshop, Dec. 13, 2015, 4 pages.
Li, et al., "Personal knowledge graph population from user utterances in Conversational understanding", In Proceedings of IEEE Spoken Language Technology Workshop, Dec. 7, 2014, 6 pages.
Hakkani-Tur, et al., "A Discriminative Classification-Based Approach to Information State Updates for a Multi-Domain Dialog System", In Proceedings of 13th Annual Conference of the International Speech Communication Association, Sep. 9, 2012, 4 pages.
U.S. Appl. No. 15/185,488, Amendment and Response filed May 8, 2017, 17 pages.
U.S. Appl. No. 15/185,488, Office Action dated Feb. 8, 2017, 21 pages.
"Final Office Action Issued in U.S. Appl. No. 15/185,488", dated May 23, 2017, 27 Pages.
PCT International Search Report and Written Opinion in PCT/US2017/036926, dated Sep. 11, 2017, 13 pages.
U.S. Appl. No. 15/185,488, Advisory Action dated Jul. 28, 2017, 3 pages.
U.S. Appl. No. 15/185,488, Office Action dated Aug. 21, 2017, 9 pages.
U.S. Appl. No. 15/185,488, Amendment and Response filed Dec. 20, 2017, 10 pages.
U.S. Appl. No. 15/185,488, Notice of Allowance dated Feb. 7, 2018, 10 pages.

* cited by examiner

SYSTEMS AND METHODS FOR BUILDING STATE SPECIFIC MULTI-TURN CONTEXTUAL LANGUAGE UNDERSTANDING SYSTEMS

CROSS-REFERENCE TO RELATED APPLICATIONS

This application is a continuation application and claims priority to U.S. patent application Ser. No. 15/185,488, filed Jun. 17, 2016, entitled "SYSTEMS AND METHODS FOR BUILDING STATE SPECIFIC MULTI-TURN CONTEXTUAL LANGUAGE UNDERSTANDING SYSTEMS," which application is incorporated herein by reference in its entirety.

BACKGROUND

Language understanding systems, personal digital assistants, agents and artificial intelligence, and artificial intelligence are changing the way users interact with the computers. Developers of computers, web services, and/or applications are always trying to improve the interactions between humans and computers. However, building such systems requires significant amount of expertise, time, money, and other resources.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for building state specific multi-turn contextual language understanding systems. More specifically, the systems and methods disclosed herein infer or are configured to infer state-specific decoding configurations from a single-shot language understanding system, such as a dialog-state dependent semantic schema and/or dialog-state dependent rules. As such, the systems and methods as disclosed herein only require the information necessary to form a single-shot language understanding model or single-shot rules from a builder or author to build a dialog-state specific multi-turn contextual language understanding system. Accordingly, the systems and methods disclosed herein for building state specific multi-turn contextual language understanding systems reduce the expertise, time, and resources necessary to build a state specific multi-turn contextual language understanding system for an application when compared to systems and methods that do not infer or provide the capability to infer a state-specific schema and/or state specific rules.

One aspect of the disclosure is directed to a system with a platform for building a dialog-state specific multi-turn contextual language understanding system for an application. The system includes at least one processor and a memory. The memory encodes computer executable instruction that, when executed by the at least one processor, are operative to:
  receive information from a builder for building a single-shot language understanding model;
  configure the single-shot language understanding model based on the information;
  constrain a decoding of the single-shot language understanding model to output only dialog-state specific slots and dialog-state specific entities for each determined dialog-state based on a dialog-state dependent semantic schema; and
  implement a constrained single-shot language understanding model to form the dialog-state specific multi-turn contextual language understanding system.

Another aspect of the disclosure is directed to a system with a platform for building a dialog-state specific multi-turn contextual language understanding system for an application. The system includes at least one processor and a memory. The memory encodes computer executable instruction that, when executed by the at least one processor, are operative to:
  receive information from a builder for authoring single-shot rules;
  form the single-shot rules based on the information;
  infer a dialog-state dependent semantic schema for different dialog states based on the single-shot rules;
  derive dialog-state dependent rules for the different dialog states based on the single-shot rules and the dialog-state dependent semantic schema; and
  implement the dialog-state dependent rules to form the dialog-state specific multi-turn contextual language understanding system.

Another aspect of the disclosure is directed to a system with a platform for building a dialog-state specific multi-turn contextual language understanding system for an application. The system includes at least one processor and a memory. The memory encodes computer executable instruction that, when executed by the at least one processor, are operative to:
  receive information from a builder for authoring single-shot rules;
  form the single-shot rules based on the information;
  provide a capability to infer a dialog-state dependent semantic schema for different dialog states based on the single-shot rules and based on user input from a dialog with a user during decoding to form a first provided capability;
  provide a capability to derive dialog-state dependent rules based on the dialog-state dependent semantic schema, the single-shot rules, and the user input from the dialog with the user during the decoding to form a second provided capability; and
  implement the single-shot rules, the first provided capability, and the second provided capability to form the dialog-state specific multi-turn contextual language understanding system.

Another aspect of the disclosure is directed to a system with a platform for building a dialog-state specific multi-turn contextual language understanding system for an application. The system includes at least one processor and a memory. The memory encodes computer executable instruction that, when executed by the at least one processor, are operative to:
  receive information from a builder for authoring a combined single-shot language understanding system based on a combination of a machine learned single-shot model and single-shot rules;
  form the combined single-shot language understanding system based on the information, wherein the combined single-shot language understanding system includes a machine learned single-shot language understanding model and a the single-shot rules;

adapt the combined single-shot language understanding system for dialog-state dependent decoding to form an adapted combined single-shot language understanding model; and implement the adapted combined single-shot language understanding model to form the dialog-state specific multi-turn contextual language understanding system.

Yet another aspect of the disclosure includes a method for a dialog-state specific multi-turn contextual language understanding system for an application. The method includes:

receiving information from a builder for building a single-shot language understanding model;

configuring the single-shot language understanding model based on the information;

constraining a decoding of the single-shot language understanding model to output only dialog-state specific slots and dialog-state specific entities for each determined dialog-state based on a dialog-state dependent semantic schema; and implementing a constrained single-shot language understanding model to form the dialog-state specific multi-turn contextual language understanding system.

Yet another aspect of the disclosure includes a method for a dialog-state specific multi-turn contextual language understanding system for an application. The method includes:

receiving information from a builder for authoring single-shot rules;

forming the single-shot rules based on the information;

inferring a dialog-state dependent semantic schema for different dialog states based on the single-shot rules;

deriving dialog-state dependent rules for the different dialog states based on the single-shot rules and the dialog-state dependent semantic schema; and implementing the dialog-state dependent rules to form the dialog-state specific multi-turn contextual language understanding system.

A further aspect of the disclosure includes a method for a dialog-state specific multi-turn contextual language understanding system for an application. The method includes:

receiving information from a builder for authoring single-shot rules;

forming the single-shot rules based on the information;

providing a capability to infer a dialog-state dependent semantic schema for different dialog states based on the single-shot rules and based on user input from a dialog with a user during decoding to form a first provided capability;

providing a capability to derive dialog-state dependent rules based on the dialog-state dependent semantic schema, the single-shot rules, and the user input from the dialog with the user during the decoding to form a second provided capability; and implementing the single-shot rules, the first provided capability, and the second provided capability to form the dialog-state specific multi-turn contextual language understanding system.

An additional aspect of the disclosure includes a method for a dialog-state specific multi-turn contextual language understanding system for an application. The method includes:

receiving information from a builder for authoring a combined single-shot language understanding system based on a combination of a machine learned single-shot model and single-shot rules;

forming the combined single-shot language understanding system based on the information, wherein the combined single-shot language understanding system includes a machine learned single-shot language understanding model and a the single-shot rules;

adapting the combined single-shot language understanding system for dialog-state dependent decoding to form an adapted combined single-shot language understanding model; and implementing the adapted combined single-shot language understanding model to form the dialog-state specific multi-turn contextual language understanding system.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1A:
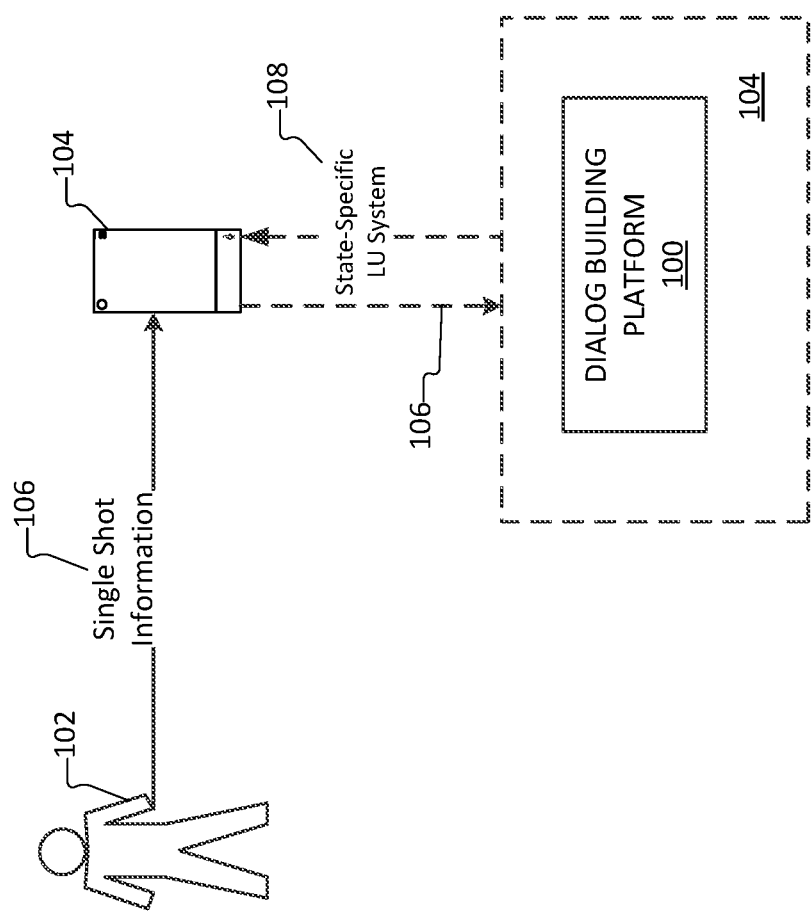
FIG. 1A is a schematic diagram illustrating a dialog building platform being utilized by a builder via a client computing device, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Progress in machine learning, language understanding and artificial intelligence are changing the way users interact with the computers. Digital assistant applications, such as Siri, Google Now and Cortana are examples of the shift in human computer interaction.

It is widely expected that the next wave of computing would be around conversation as a platform (CaaP). Bot platforms for building conversational agents for applications and services are emerging as an instance of CaaP. Bots are primarily targeting messaging workflows such as messenger, webchat and skype, where the main form interaction is through text (typing), even though touch and speech can also be used as additional modalities, such as speech recognition. A user can interact with a bot through multi-turn dialog. However, CaaP will be a reality only if the third party applications and services can easily build a bot to serve the customers. This will enable scaling to tens of thousands of applications and services.

However, building multi-turn dialog systems has been a difficult task due to the complexity of multi-turn dialogs. There are various recently deployed platforms that enable third party authoring of natural language experiences (e.g. with ai, luis, and api.ia) targeting single-turn experiences. However, these previously deployed platforms are limited to single-turn experiences because building multi-turn dialog platforms requires a significant amount of time and resources to account for the exponential amount of different scenarios for any given task.

For example, consider a simple agent or bot that provides the ferry schedule between Seattle and various destinations (e.g. Bremerton, Bainbridge islands etc.). Some sample dialogs the agent/bot is expected to handle, in this example, are listed below:

Scenario #1
[User Turn 1]: I would like to get ferry schedules.
[Bot Turn 1]: Great, I can get you schedules between Seattle and various destinations, where do you want to go?
[User Turn 2]: I would like to go to Bremerton from Seattle.
[Bot Turn 2]: Which dates you want?
[User Turn 3]: Tomorrow.
[Bot Turn 3]: Here are ferries starting at 8:00 am . . . .
Scenario #2
[User Turn 1]: I would like to get ferry schedules.
[Bot Turn 1]: Great, I can get you schedules between Seattle and various destinations, where do you want to go?
[User Turn 2]: Seattle.
[Bot Turn 2]: Where do you want to leave from?
[User Turn 3]: Bremerton.

There are more scenarios that could be added. The challenge here is how to build language understanding models (or rules) that will tag "to_location" and "from_location." In Scenario #1, the user utterances (User Turns 1, 2, and 3) provide sufficient information to the multi-turn dialog system for the model to extract the "to_location" (Bremerton) and to extract the "from_location" (Seattle), but in Scenario #2, the user utterances (User Turns 1, 2, and 3) do not provide sufficient information to the multi-turn dialog system for the model to extract the "to_location" and "from_location." In Scenario #2, the dialog system has to use the system or bot responses (Bot Turns 1 and 2) as well, to correctly tag Seattle at the "to_location" and Bremerton as the "from_location." However, even if bot responses are utilized by the multi-turn dialog system, the developer or builder of the multi-turn dialog system still has to build potentially n! (where n is the number of slots/entities needed for the application) language understanding models or rules sets. Additionally, the developer or builder of the multi-turn dialog system has to build the potentially n! language understanding models or rules sets for each different and possible dialog-state. As such, the complexity and the resources necessary to build a multi-turn dialog system is a bottleneck in adopting conversational interfaces more widely. Accordingly, most developers are limited to single-turn dialog systems. In the absence of an accurate multi-turn dialog system, a dialog between an application and a client is likely to fail, as the system fails to interpret the user query properly. As such, a builder of a dialog system still has to have a significant amount of domain expertise, knowledge, time, and resources to create a functional multi-turn dialog system utilizing these previous systems and methods. There is currently no easy or scalable way to author or build a multi-turn dialog system.

The systems and method as disclosed herein are directed to a dialog building platform for building dialog-state specific multi-turn contextual language understanding (LU) systems while only requiring a builder to input the information necessary to create a single-shot language understanding (LU) system. The system could be a rule-based or a machine learned system. More specifically, the systems and methods disclosed herein infer/derive or are configured to infer/derive state-specific decoding configurations, such as a dialog-state dependent semantic schema and/or dialog-state dependent rules. Accordingly, the systems and methods as disclosed herein allow a third party developer to build dialog-state specific multi-turn contextual LU system for digital agents, bots, messaging applications, voice agents or any other application types without requiring a significant amount of domain expertise, time, and other resources.

The ability of the systems and methods described herein to provide a dialog building platform to create a dialog-state specific multi-turn contextual LU system without requiring any further input from the builder than necessary to form a single-shot LU model and/or single-shot rules provides an easy to use and efficient service for building multi-turn dialog systems.

Figure 1B:
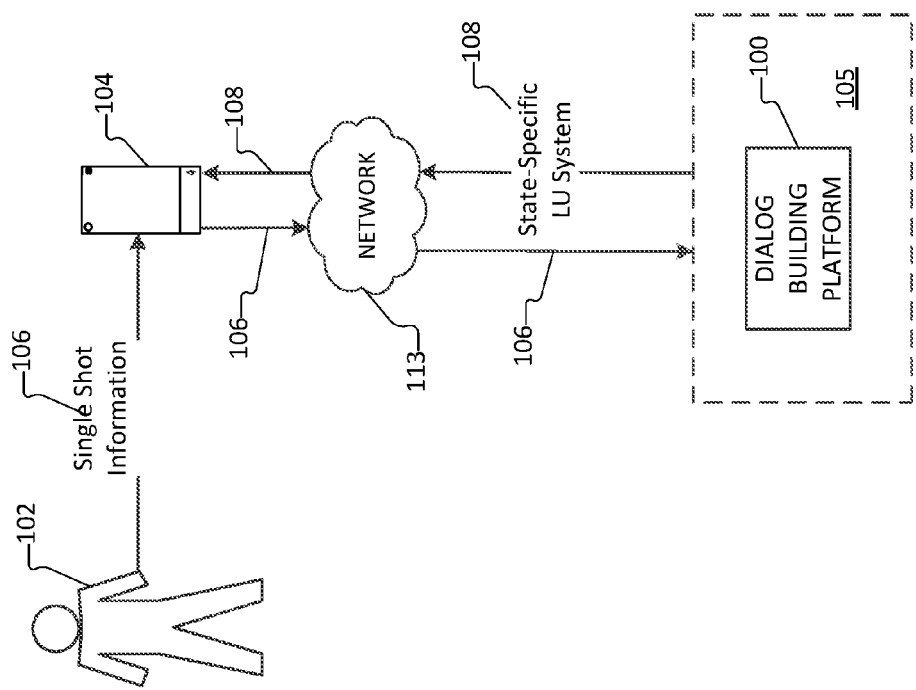
FIG. 1B is a schematic diagram illustrating a dialog building platform being utilized by a builder via a client computing device, in accordance with aspects of the disclosure.

FIGS. 1A and 1B illustrate different examples of a dialog building platform 100 being utilized by a builder 102 (or user 102 of the dialog building platform 100) via a client computing device 104, in accordance with aspects of the disclosure. The dialog building platform 100 is a platform that allows a builder 102 (or user of the dialog building platform 100) to develop, build, or author a dialog-state specific multi-turn contextual LU system 108 while only having to provide the information 106 necessary to build a single-shot language understanding LU system. A single-shot LU system utilizes a single-shot LU model and/or a single-shot rule set. The single-shot LU system requires a user to provide all of the parameters, slots, and/or entities necessary for performing a desired task in one turn of a dialog or conversation with the single-shot LU system. In contrast, a dialog-state specific multi-turn contextual LU system 108 may gather the parameters, slots, and/or entities necessary for performing a desired task over any number of turns of a conversation with a user.

In some aspects, the dialog building platform 100 is implemented on the client computing device 104 as illustrated in FIG. 1A. In a basic configuration, the client computing device 104 is a computer having both input elements and output elements. The client computing device 104 may be any suitable computing device for implementing the dialog building platform 100. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 104 for implementing the dialog building platform 100 may be utilized.

In other aspects, the dialog building platform 100 is implemented on a server computing device 105, as illustrated in FIG. 1B. The server computing device 105 may provide data to and/or receive data from the client computing device 104 through a network 113. In some aspects, the network 113 is a distributed computing network, such as the internet. In further aspects, that dialog building platform 100 is implemented on more than one server computing device 105, such as a plurality or network of server computing devices 105. In some aspects, the dialog building platform 100 is a hybrid system with portions of the dialog building platform 100 on the client computing device 104 and with portions of the dialog building platform 100 on the server computing device 105.

The dialog building platform 100 includes a user interface for building the dialog-state specific multi-turn contextual LU system 108. The user interface is generated by the dialog building platform 100 and presented to the builder 102 via the client computing device 104. The user interface of the dialog building platform 100 allows the builder 102 to select or provide the task definition 202 and/or the necessary information 106 for building a single-shot LU model to the dialog building platform 100. The client computing device 104 may have one or more input devices, such as a keyboard, a mouse, a pen, a microphone or other sound or voice input device, a touch or swipe input device, etc. for allowing the builder 102 to provide the task definition 202 and/or the information 106 via the user interface. The aforementioned devices are examples and others may be used.

Figure 4A:
FIG. 4A is schematic diagram illustrating a user interface provided by a dialog building platform, in accordance with aspects of the disclosure.
Figure 4B:
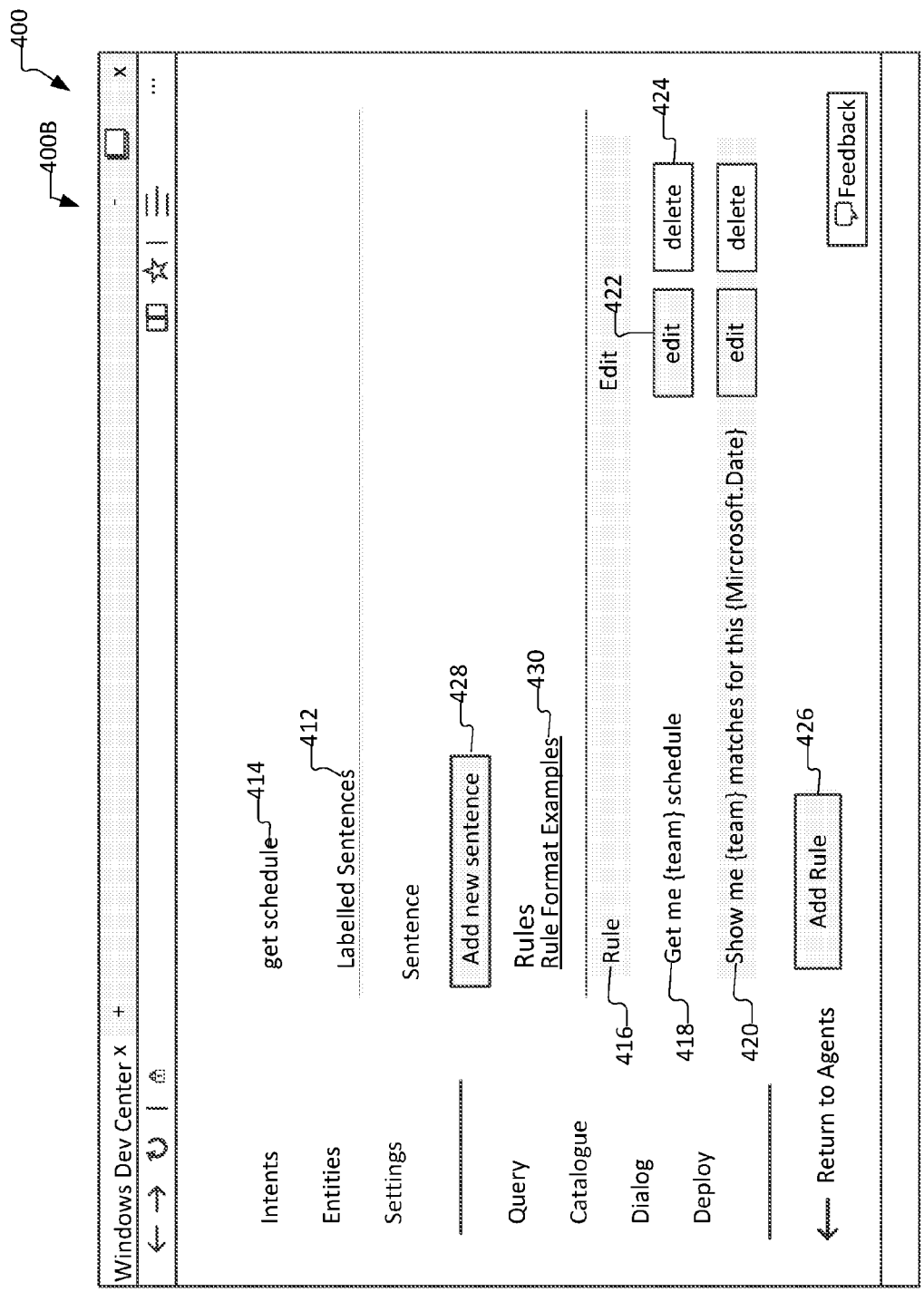
FIG. 4B is schematic diagram illustrating a user interface provided by a dialog building platform, in accordance with aspects of the disclosure.

FIGS. 4A and 4B show an example a user interface 400 for the dialog building platform 100 during different phases of the building process for building a rule-based dialog-state specific multi-turn contextual LU system. The same or different interfaces 400 may be provided for building a machine learned dialog-state specific multi-turn contextual LU system or a combined dialog-state specific multi-turn contextual LU system by the dialog building platform 100. The dialog building platform 100 may provide any suitable interface 400 for building a dialog-state specific multi-turn contextual LU system 108.

FIG. 4A shows the user interface 400A generated by the dialog building platform 100 at the start of the building process for task or dialog authoring. In this task or dialog authoring interface 400A, the builder 102 has selected the "Dialog" option or button 402 and is requested to name 404 the dialog the builder 102 is going to create. In this example, the builder 102 input the name 404 "SoccerSchedule" 406. In this example, the builder 102 is building or authoring a dialog for retrieving MLS team schedules. In some aspects, the user interface 400A provides the last time the named dialog was modified under a "Last Modified" heading 405. In this example, the "SoccerSchedule" 406 was last modified as of "Today" 407. Once the new dialog has been named, the builder 102 may select the "Create Dialog" button or option 408 to start building the new dialog. In further aspects, the user interface 400A provides a simulation option or button 409 (shown as "Run Tests" 409) for simulating the performance of a dialog-state specific multi-turn contextual LU system 108 formed based on the current constrained and/or adapted single-shot LU model created utilizing the dialog building platform 100.

FIG. 4B shows the user interface 400B generated by the dialog building platform 100 for rule authoring. The rule authoring interface 400B and/or a model authoring interface is provided to the builder 102 after the "Create Dialog" button 408 has been selected by the builder 102. In this interface 400B, the builder 102 can enter a labelled sentence 412. In this example, the builder 102 entered the labelled sentence, "get schedule" 414. The builder 102 may add additional labelled sentences as desired by selecting the "add new sentence" button or option 428. Further, on this rule authoring interface 400B, the builder 102 may add rules 416 for a labelled sentence 412 via the "add rule" button or option 426, may edit rules 416 via an "edit" button or option 422, or may delete rules 416 via a "delete" button or option 424. In this example, the builder 102 has authored two different rules, such as "get me (MLS team) schedule" 418 and "show me (team) matches for this (Microsoft.Date)" 420. The rule authoring interface 400B may also provide some rule formatting examples upon selection of a "Rule Format Examples" button or option 430.

In some aspects the builder 102 provides a task definition 202 or dialog definition 202 to the dialog building platform 100 via the client computing device 104 and the provided user interface 400. The task definition 202 may include any data, modules, or systems necessary to perform a desired task. For example, the task definition 202 may include a task trigger module, a validation module, a language generation module, and a final action module. A module as utilized herein may run one or more software applications of a program. In other words, the module may be a separate, interchangeable component of a program that contains one or more program functions and contains everything necessary to accomplish this function. In some aspects, the module includes memory and one or more processors.

The builder 102 provides the information 106 necessary to build a single-shot LU system to the dialog building platform 100 via the user interface 400 presented by the client computing device 104. In some aspects, the information 106 is based on the task of the selected task definition. The single-shot LU system may be a rule-based single-shot LU system, a machine learned single-shot LU system, or a combined single-shot LU system. The information 106 may be the data necessary to build a machine learned single-shot LU system and/or the data necessary to build a rule-based single-shot LU system. In an alternative aspect, the builder 102 provides the necessary information 106 to build a combined single-shot LU system. The combined single-shot LU system utilizes both a rule based LU system and a machine learned LU system to decode dialog from a user. For example, the information 106 may include any parameters, slots, entities, bindings or mappings, and etc. that are necessary for authoring a single-shot LU system. While the builder 102 only has to provide the information necessary to form the single-shot LU system, the builder may provide additional information as desired.

The dialog building platform 100 receives the information 106. Utilizing the information, the dialog building platform 100 forms or configures a single-shot LU system. Once the single-shot LU system has been formed or configured, the dialog building platform 100 provides state-specific decoding configuration to the single-shot LU system. The state-specific decoding configuration varies depending upon the type of single-shot LU system. The single-shot LU system may be a machine learned, a rule-based, or a combined machine learned and rule-based LU system. In some aspects, the components necessary for dialog-state dependent decoding are inferred and/or derived by the dialog building platform 100. In alternative aspects, a capability to infer and/or derive the components is provided by the dialog building platform 100. This capability may be provided as a program module suitable for running software applications. The components may be a dialog-state dependent semantic schema and/or dialog-state dependent rules.

The dialog building platform 100 utilizes the LU system with the state-specific decoding configurations to form a dialog-state specific multi-turn contextual LU system 108. The dialog building platform 100 provides the dialog-state specific multi-turn contextual LU system 108 to the builder 102. The builder 102 may then add the dialog-state specific multi-turn contextual LU system 108 to any desired digital agent, bot, messaging application, voice agent, or any other application type.

Figure 2A:
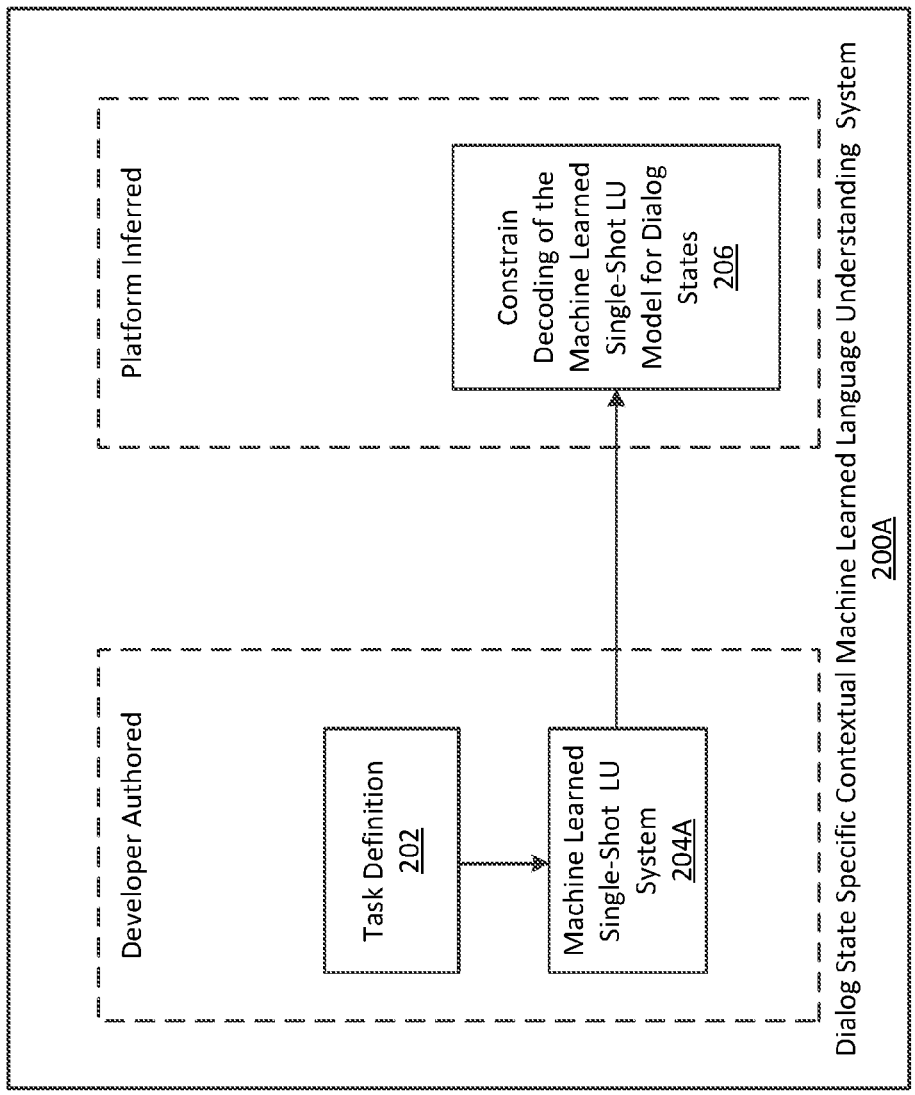
FIG. 2A is a simplified block diagram illustrating a machine learned state specific contextual language understanding system built via a dialog building platform, in accordance with aspects of the disclosure.

In some aspects, the dialog building platform 100 is utilized to form a machine learned dialog-state specific multi-turn contextual LU system 200A as illustrated in FIG. 2A. In these aspects, the builder 102 may provide a task definition 202 (or dialog definition 202) to the dialog building platform 100. In these aspects, the builder 102 provides the information 106 necessary to build a single-shot machine learned model to the dialog building platform 100. The dialog building platform 100 forms or configures a machine learned single-shot LU model 204A based on the information 106 from the builder 102. In these aspects, the dialog building platform 100 configures the model 204A for dialog-state dependent decoding by constraining a decoding 206 of the machine learned single-shot LU model to output only dialog-state specific slots and dialog-state specific entities for each determined dialog-state based on a dialog-state dependent semantic schema to form a constrained machine learned single-shot model. The constrained machine learned single-shot model is implemented to form the machine learned dialog-state specific multi-turn contextual LU system 200A. In other words, when the machine learned dialog-state specific multi-turn contextual LU system 200A is used by a user or receives user input (such as utterances) from a user, the system 200A removes any provided parameters, slots, and/or entities from the single-shot LU model and then responds utilizing the constrained single-shot LU model. This process continues until all of the necessary data for performing the task or dialog is provided by the user to the machine learned dialog-state specific multi-turn contextual LU system 200A.

In some aspects, the dialog building platform 100 infers the dialog-state dependent semantic schema for different dialog-states based on the machine learned single-shot LU model 204A. The dialog building platform 100 infers the dialog-state dependent semantic schema prior to the formation of the machine learned dialog-state specific multi-turn contextual LU system 200A.

In alternative aspects, the dialog building platform 100 provides a capability to infer a dialog-state dependent semantic schema for different dialog-states based on the machine learned single-shot LU model 204A and based on user input received by the system 200A from a dialog with a user during the decoding. This capability may be provided as a program module suitable for running software applications. In other words, the machine learned dialog-state specific multi-turn contextual LU system 200A is configured to infer the dialog-state dependent semantic schema dynamically during the decoding of user dialog.

Figure 2B:
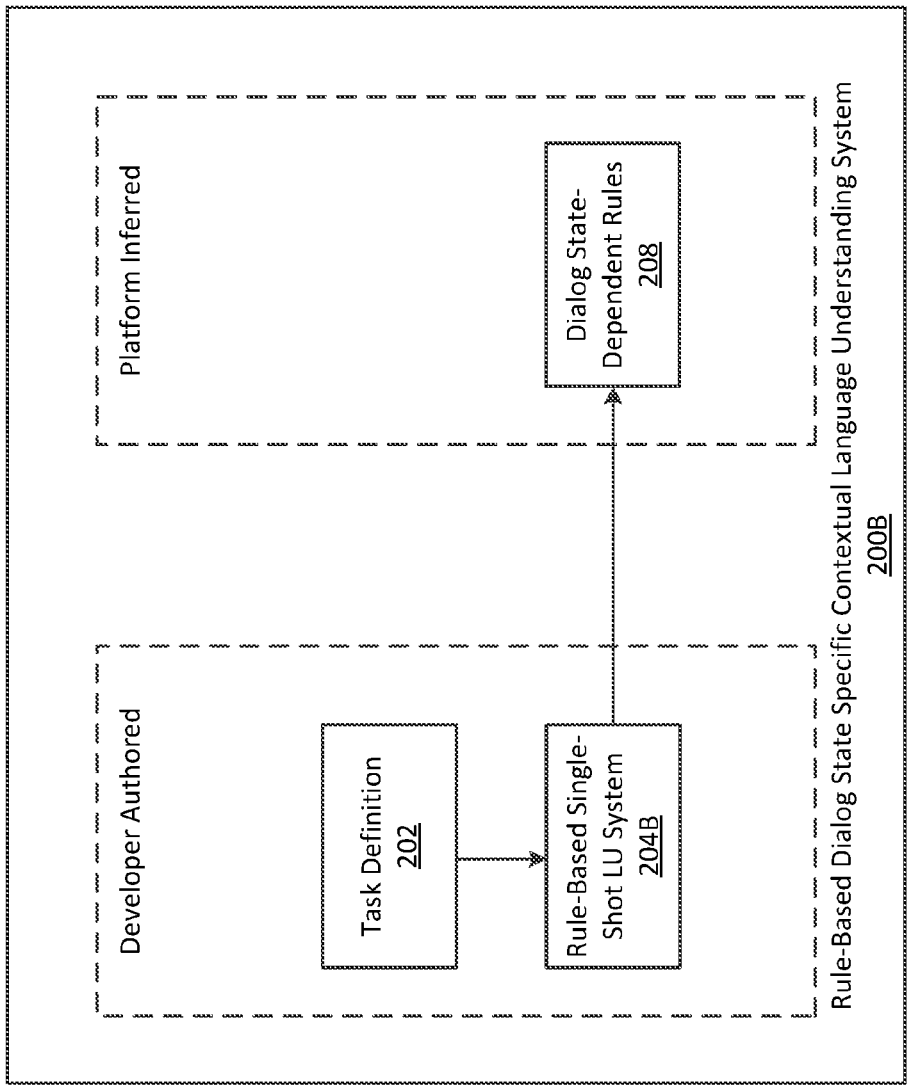
FIG. 2B is a simplified block diagram illustrating a rule-based state specific contextual language understanding system built via a dialog building platform, in accordance with aspects of the disclosure.

In some aspects, the dialog building platform 100 is utilized to form a rule-based dialog-state specific multi-turn contextual LU system 200B as illustrated in FIG. 2B. In these aspects, the builder 102 may provide a task definition 202 (or dialog definition 202) to the dialog building platform 100. In these aspects, the builder 102 provides the information 106 necessary to build a single-shot rule-based system 204B to the dialog building platform 100. The dialog building platform 100 forms a set of single-shot rules based on the information 106 from the builder. In these aspects, the dialog building platform 100 provides state specific decoding configurations to the system 204B by utilizing derived dialog-state dependent rules 208 and an inferred dialog-state dependent semantic schema to tag dialog-state specific slots and dialog-state specific entities for a determined dialog-state. The decoding configured system is implemented by the dialog building platform 100 to form the rule-based dialog-state specific multi-turn contextual LU system 200B. In other words, when the rule-based dialog-state specific multi-turn contextual LU system 200B receives user input from a user, the system 200B only tags dialog-state specific slots and dialog-state specific entities for a determined dialog-state r. This process continues until all of the necessary data for performing the task is provided by the user to the rule-based dialog-state specific multi-turn contextual LU system 200B.

In some aspects, the dialog building platform 100 infers the dialog-state dependent semantic schema for different dialog-states based on the single-shot rules of the rule-based single-shot LU system 204B. In these aspects, the dialog building platform 100 infers the dialog-state dependent semantic schema prior to the formation of the rule-based dialog-state specific multi-turn contextual LU system 200B.

In alternative aspects, the dialog building platform 100 provides a capability to infer a dialog-state dependent semantic schema for different dialog-states based on the single-shot rules of the rule-based single-shot LU system 204B and based on user input received by system 200B from a dialog with a user during the decoding. This capability may be provided as a program module suitable for running software applications. In other words, in these aspects, the rule-based dialog-state specific multi-turn contextual LU system 200B infers the dialog-state dependent semantic schema dynamically during the decoding of user dialog.

In some aspects, the dialog building platform 100 derives the dialog-state dependent rules 208 for the different dialog-states based on the single-shot rules and the dialog-state dependent semantic schema. In these aspects, the dialog building platform 100 infers the dialog-state dependent rules 208 prior to the formation of the rule-based dialog-state specific multi-turn contextual LU system 200B.

In alternative aspects, the dialog building platform 100 provides a capability to infer or derive dialog-state dependent rules 208 for different dialog-states based on the single-shot rules, the dialog-state dependent semantic schema, and based on user input received by the system 200B from a dialog with a user during the decoding. In other words, the rule-based dialog-state specific multi-turn contextual LU system 200B derives the dialog-state dependent rules 208 dynamically during the decoding of user dialog. This capability may be provided as a program module suitable for running software applications.

Figure 2C:
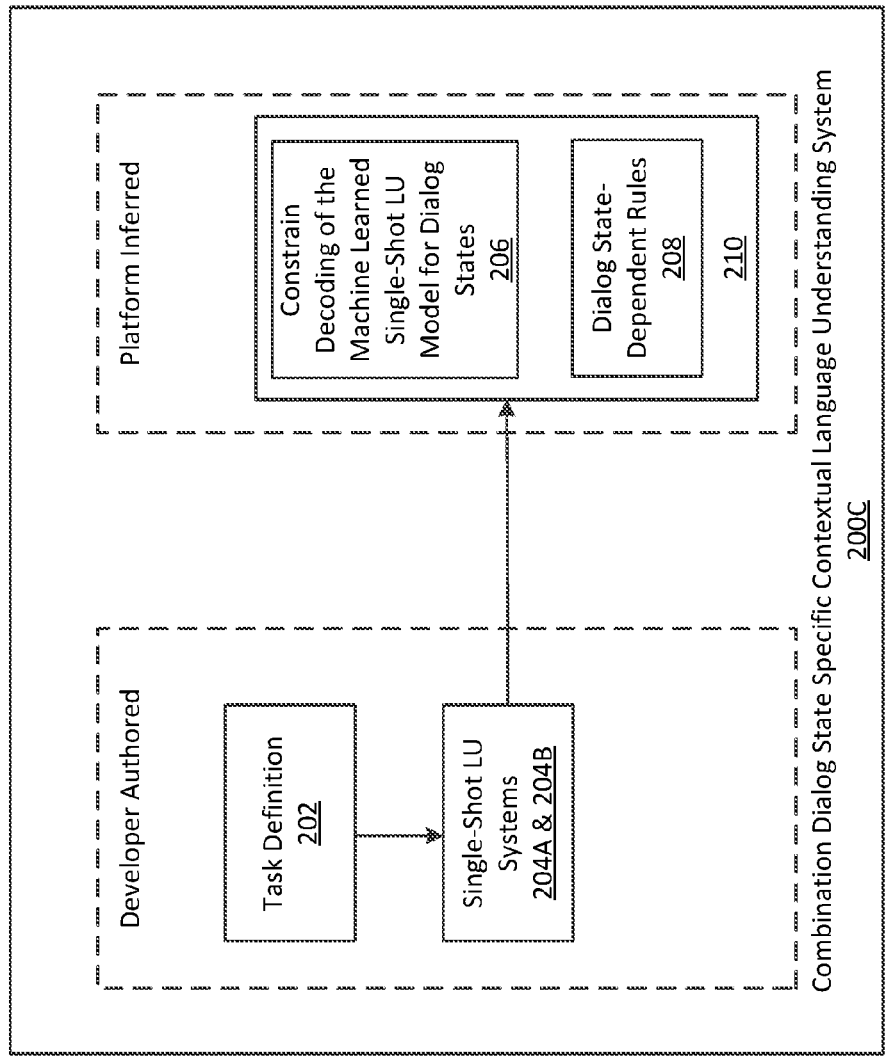
FIG. 2C is a simplified block diagram illustrating a combined state specific contextual language understanding system built via a dialog building platform, in accordance with aspects of the disclosure.

In some aspects, the dialog building platform 100 is utilized to form a combined dialog-state specific multi-turn contextual LU system 200C as illustrated in FIG. 2C. In these aspects, the builder 102 may provide a task definition 202 (or dialog definition 202) to the dialog building platform 100. In these aspects, the builder 102 provides the information 106 necessary to build a machine learned single-shot LU system 204A and a rule-based single-shot LU system 204B to the dialog building platform 100. The dialog building platform 100 forms a rule-based single-shot LU system 204B and a machine learned single-shot LU system 204A based on the information 106 from the builder 102. In these aspects, the dialog building platform 100 adapts the systems 204A & 204B for dialog-state dependent decoding 210 by:

constraining a decoding 206 of the machine learned single-shot language understanding model to output only dialog-state specific slots and dialog-state specific entities for at least one determined dialog-state based on an inferred dialog-state dependent semantic schema to form a constrained machine learned single-shot language understanding model; and provides state specific decoding configurations to system 204B by utilizing derived dialog-state dependent rules 208 and an inferred dialog-state dependent semantic schema to tag dialog-state specific slots and dialog-state specific entities for one or more determined dialog-states, to form an adapted, combined single-shot system. The dialog building platform 100 implements the adapted, combined single-shot system to form the combined dialog-state specific multi-turn contextual LU system 200C.

In some aspects, the dialog building platform 100 infers the dialog-state dependent semantic schema for different dialog-states based on the single-shot language understanding model and/or the single-shot rules. In these aspects, the dialog building platform 100 infers the dialog-state dependent semantic schema prior to formation of the combined dialog-state specific multi-turn contextual LU system 200C.

In alternative aspects, the dialog building platform 100 provides a capability to infer a dialog-state dependent semantic schema for one or more dialog-states based on the single-shot language understanding model and/or the single-shot rules, and based on user input received by system 200C from a dialog with a user during the decoding. In other words, the combined dialog-state specific multi-turn contextual LU system 200C infers the dialog-state dependent semantic schema dynamically in response decoding dialog from a user. This capability may be provided as a program module suitable for running software applications.

In some aspects, the dialog building platform 100 derives the dialog-state dependent rules 208 for one or more dialog-states based on the single-shot rules and inferred dialog-state dependent semantic schema. In these aspects, the dialog building platform 100 derives the dialog-state dependent rules 208 prior to the formation of the combined dialog-state specific multi-turn contextual LU system 200C.

In alternative aspects, the dialog building platform 100 provides a capability to derive dialog-state dependent rules 208 for at least one dialog-state based on the single-shot rules, the dialog-state dependent semantic schema, and based on user input received by system 200C from a dialog with a user during the decoding. In other words, the combined dialog-state specific multi-turn contextual LU system 200C derives the dialog-state dependent rules 208 dynamically during decoding of user dialog. This capability may be provided as a program module suitable for running software applications.

Figure 3:
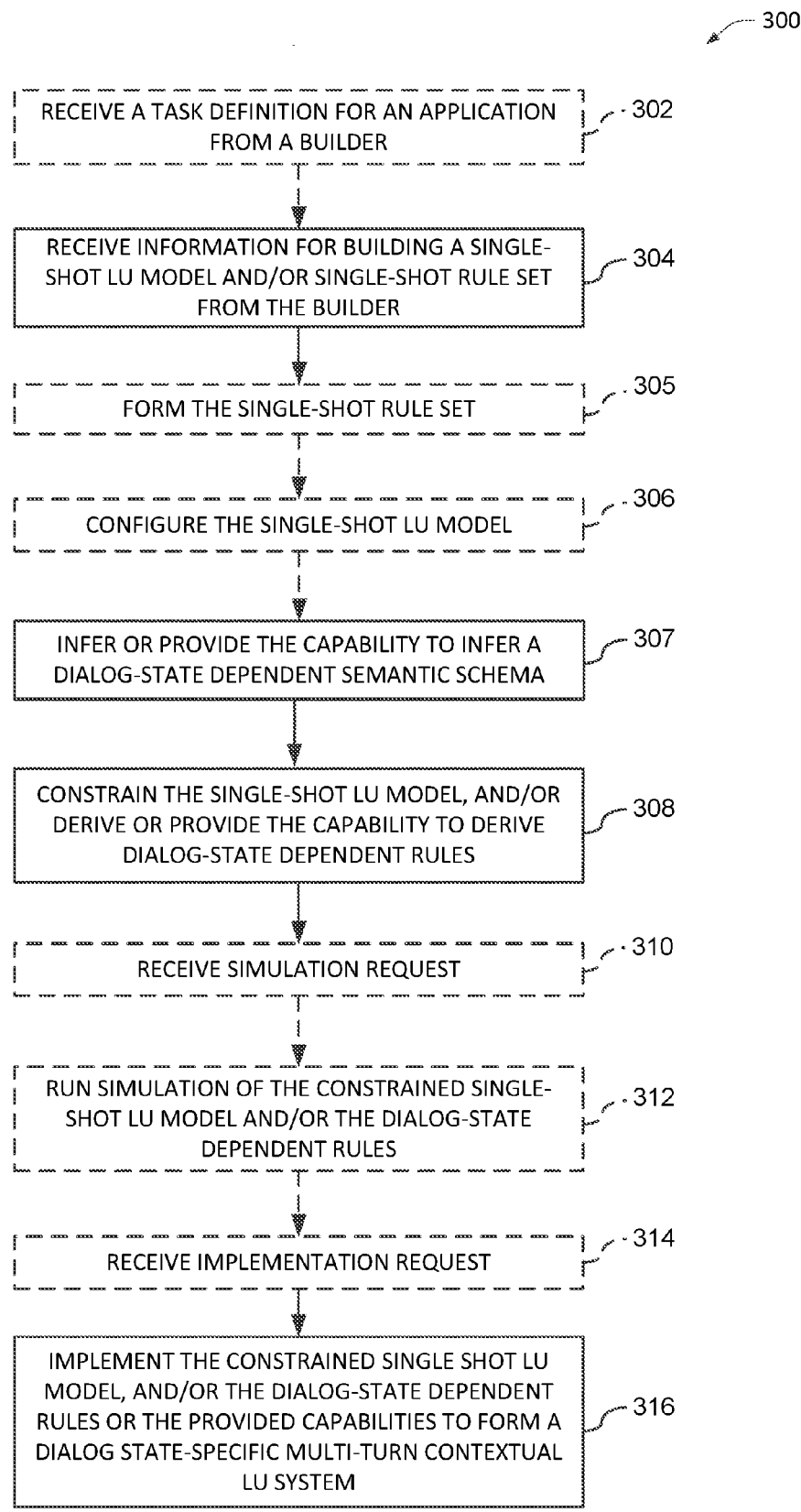
FIG. 3 is a flow diagram illustrating a method for building a state specific contextual language understanding system, in accordance with aspects of the disclosure.

FIG. 3 illustrates a flow diagram conceptually illustrating an example of a method 300 for building a dialog-state specific multi-turn contextual LU system. In some aspects, method 300 is performed by the dialog building platform 100 as described above. Method 300 provides a method for building a dialog-state specific multi-turn contextual LU system without requiring the builder to provide any more input that necessary to build a single-shot LU system. More specifically, method 300 infers or provides the capability to infer a state-specific schema and/or derives or provides the capability to derive state-specific rules from a formed single-shot language understanding system. As such, method 300 provides a method for building a dialog-state specific multi-turn contextual LU system that is easier to use and requires less expertise, less time and fewer resources than required by previously utilized methods for building dialog-state specific multi-turn contextual LU system. The dialog-state specific multi-turn contextual LU system may be a machine learned dialog-state specific multi-turn contextual LU system, a rule-based dialog-state specific multi-turn contextual LU system, or combined dialog-state specific multi-turn contextual LU system.

In some aspects, method 300 includes operation 302. At operation 302, a task definition or dialog definition for an application is received from the builder. As discussed above, the task definition may include any data, modules, or systems necessary to perform a desired task. For example, the task definition may include a task triggers module, a validation module, a language generation module, and/or a final action module.

At operation 304, information for building a single-shot LU system is received. The information may be the information necessary for building a single-shot LU model and/or a set of single-shot rules. The information is provided by a builder 102. In some aspects, the information includes parameters, entities, slots, tags, binding or mappings, and/or etc. In some aspects, the information received is based on a task of the provided task definition.

In some aspects (during the building of a rule-based or a combined dialog-state specific multi-turn contextual LU system) method 300 includes operation 305. At operation 305 a single-shot rule set is formed based on the information received at operation 304.

In some aspects (during the building of a machine learned or a combined dialog-state specific multi-turn contextual LU system) method 300 includes operation 306. At operation 306 a single-shot LU model is configured based on the information received at operation 304.

At operation 307 a dialog-state dependent semantic schema is inferred or a capability to infer a dialog-state dependent semantic schema is provided. In some aspects, an operation 307, the dialog-state dependent semantic schema for different dialog-states is inferred based on the single-shot LU model configured during operation 306 and/or the set of single-shot rules formed at operation 305. The dialog-state dependent semantic schema may be inferred at operation 307 prior to the formation of the dialog-state dependent multi-turn contextual LU system at operation 316 and prior to decoding by the formed system.

In alternative aspects, a capability to infer a dialog-state dependent semantic schema for different dialog-states is provided at operation 307. This capability may be provided as a program module suitable for running software applications. In these aspects, the capability to infer the dialog-state dependent semantic schema for different dialog-states is based on the single-shot language understanding model configured during operation 306 and/or the set of single-shot rules formed at operation 305, and based on received user input by the dialog-state dependent multi-turn contextual LU system in a dialog with a user. As such, in these aspects, the dialog-state dependent multi-turn contextual LU system formed during operation 316 is able to dynamically infer a dialog-state dependent semantic schema in response to receiving user input from a dialog with a user during a decoding.

The single-shot LU model and/or the single-shot rule set are provided with state-specific decoding configurations at operation 308. The state-specific decoding configurations vary depending on the type of dialog-state specific multi-turn contextual LU system method 300 is building. In some aspects, (during the building of a machine learned or a combined dialog-state specific multi-turn contextual LU system) a single-shot LU model is constrained at operation 308. In other aspects, (during the building of a rule-based or a combined dialog-state specific multi-turn contextual LU system), at operation 308, a set of dialog-state dependent rules are derive or the capability to derive a set of dialog-state dependent rules is provided.

In some aspects, at operation 308, the dialog-state dependent rules are derived for different dialog-states based on the single-shot rules formed during operation 305 and based on the dialog-state dependent semantic schema inferred at operation 307. In these aspects, the dialog-state dependent rules are derived prior to the formation of the dialog-state specific multi-turn contextual LU system at operation 316.

In alternative aspects, the capability to derive dialog-state dependent rules for different dialog-states is provided at operation 308. This capability may be provided as a program module suitable for running software applications. In these aspects, the capability to derive dialog-state dependent rules for one or more different dialog-states is based on single-shot rules received during operation 304, the dialog-state dependent semantic schema inferred at operation 307, and based on user input received by the dialog-state specific multi-turn contextual LU system during the decoding of a dialog with a user. In other words, the dialog-state specific multi-turn contextual LU system formed during operation 316 can derive dialog-state dependent rules dynamically in response to received user input during the decoding of user dialog.

The derived set of dialog-state dependent rules tag dialog-state specific slots and dialog-state specific entities for one or more determined dialog-states during the decoding. In these aspects, this process is continued until all the necessary parameters are provided to the dialog-state specific multi-turn contextual LU system formed during operation 316 during the decoding of a dialog.

In further aspects, the machine learned single-shot language understanding model is constrained to output only dialog-state specific slots and dialog-state specific entities for one or more determined dialog-states based on a dialog-state dependent semantic schema to form a constrained machine learned single-shot language understanding model at operation 308. In these aspects, when the machine learned dialog-state specific multi-turn contextual LU system formed by method 300 is utilized for decoding received user inputs (such as utterances), the system removes any parameters, slots, and/or entities provided in the user input from the single-shot LU model and then responds to the user by utilizing the modified or constrained single-shot LU model. This process continues until all of the necessary data for performing the task or dialog is provided by the user to the machine learned dialog-state specific multi-turn contextual LU system.

In one example, a combined single-shot LU model is adapted by:
  constraining a decoding of the machine learned single-shot language understanding model to output only dialog-state specific slots and dialog-state specific entities for at least one determined dialog-state based on an inferred dialog-state dependent semantic schema; and
  providing state specific decoding configurations to the rule-based system by utilizing derived dialog-state dependent rules and an inferred dialog-state dependent semantic schema to tag dialog-state specific slots and dialog-state specific entities for one or more determined dialog-states,
to form an adapted combined single-shot LU system at operation 308.

In some aspects, method 300 includes operation 310 and operation 312. A simulation request is received at operation 310. The simulation request may be received via a user interface from a builder. The user interface may provide and/or display a simulation option to a builder. At operation 312 a simulation of a constrained single-shot LU model and/or a set of dialog-state dependent rules are run in response to receiving the simulation request at operation 310. The simulation allows a builder to simulate or test how a currently built constrained single-shot LU model and/or currently derived set of dialog-state dependent rules would behave if implemented into a dialog-state specific multi-turn contextual LU system. For example, a simulation at operation 312 could consist of using a set of utterances provided by the builder or could consist of automatically generated simulated-user utterances and system responses to test an implemented constrained single-shot LU model and/or currently derived set of dialog-state dependent rules.

In further aspects, method 300 includes operation 314. An implementation request is received at operation 314. The implementation request may be received via a user interface from a builder. The user interface may provide and/or display an implementation simulation option to a builder.

At operation 316 a dialog-state specific multi-turn contextual LU system is formed. In some aspects, the dialog-state specific multi-turn contextual LU system is formed by implementing the constrained single-shot LU model at operation 316. In other aspects, the dialog-state specific multi-turn contextual LU system is formed by implementing a set of dialog-state dependent rules at operation 316. In further aspects, the dialog-state specific multi-turn contextual LU system is formed by implementing the capability to derive a set of dialog-state dependent rules and/or a state-dependent semantic schema.

In some aspects, operation 316 is performed in response to receiving an implementation request at operation 314. In other aspects, operation 316 is performed automatically after operation 308. The created dialog-state specific multi-turn contextual LU system is provided to the builder. The builder may then add the created dialog-state specific multi-turn contextual LU system to any desired digital agent, bot, messaging application, voice agent, and/or any other application type.

While the dialog-state specific multi-turn contextual LU system formed by method 300 is capable of being formed and implemented without requiring any further input from the builder at operation 304 other than the information necessary to form a single-shot LU system, the builder may provide additional information as desired.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
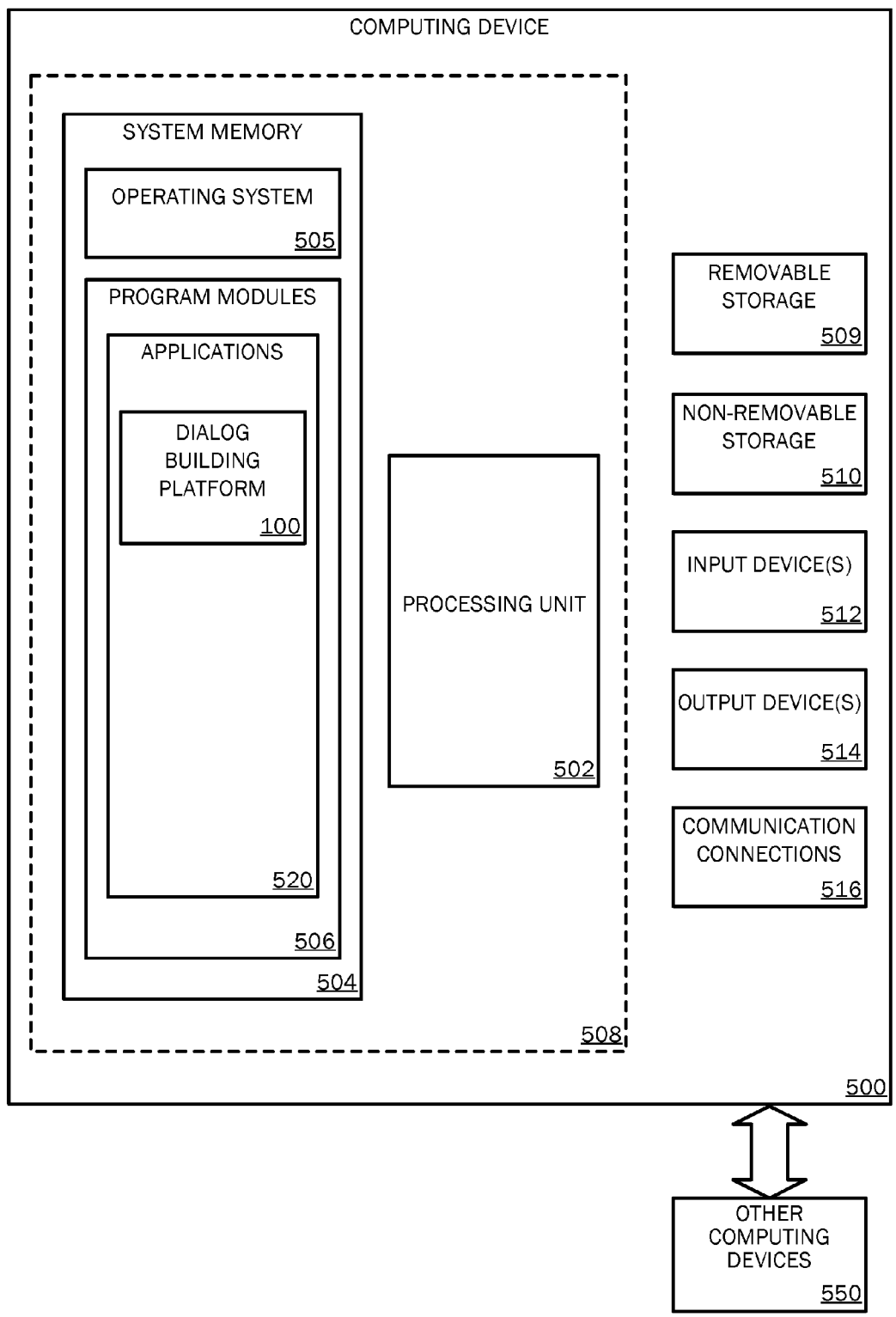
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the dialog building platform 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the dialog building platform 100 that can be executed to employ method 300 to create a dialog-state specific multi-turn contextual LU system 108 as disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510. For example, any inferred dialog-state dependent rules, configuration to infer dialog-state dependent rules, any inferred dialog-state dependent semantic schema, and/or configuration to infer dialog-state dependent semantic schema of the dialog building platform 100 could be stored on any of the illustrated storage devices.

As stated above, a number of program modules and data files may be stored in the system memory 504. While executing on the processing unit 502, the program modules 506 (e.g., the dialog building platform 100) may perform processes including, but not limited to, performing method 300 as described herein. For example, the processing unit 502 may implement the dialog building platform 100. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc. In some aspect, the dialog building platform 100 allows a builder to build a dialog-state specific multi-turn contextual LU system 108 for one or more of the above referenced applications.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
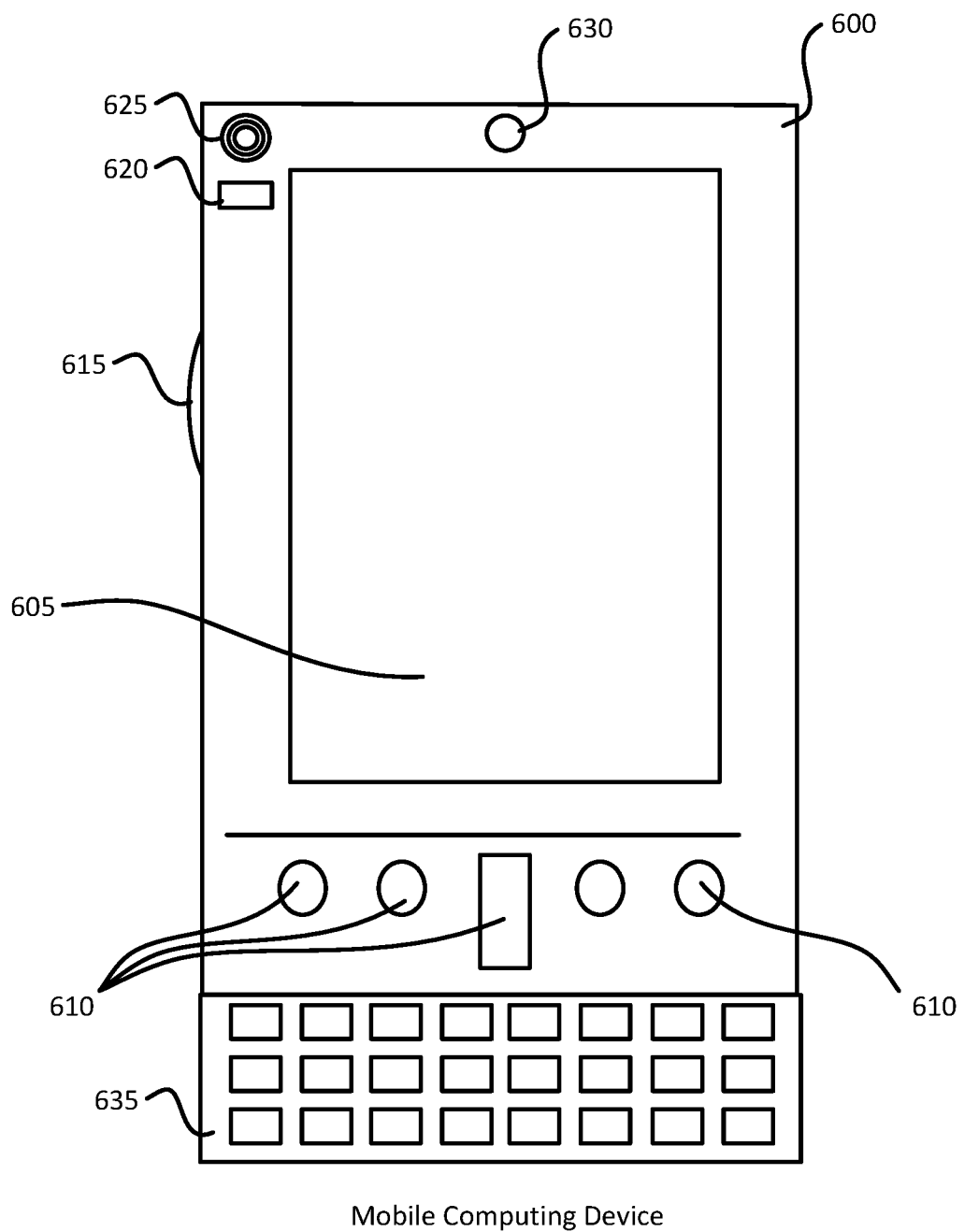
FIG. 6A is a simplified block diagram of a mobile computing device with which various aspects of the disclosure may be practiced.
Figure 6B:
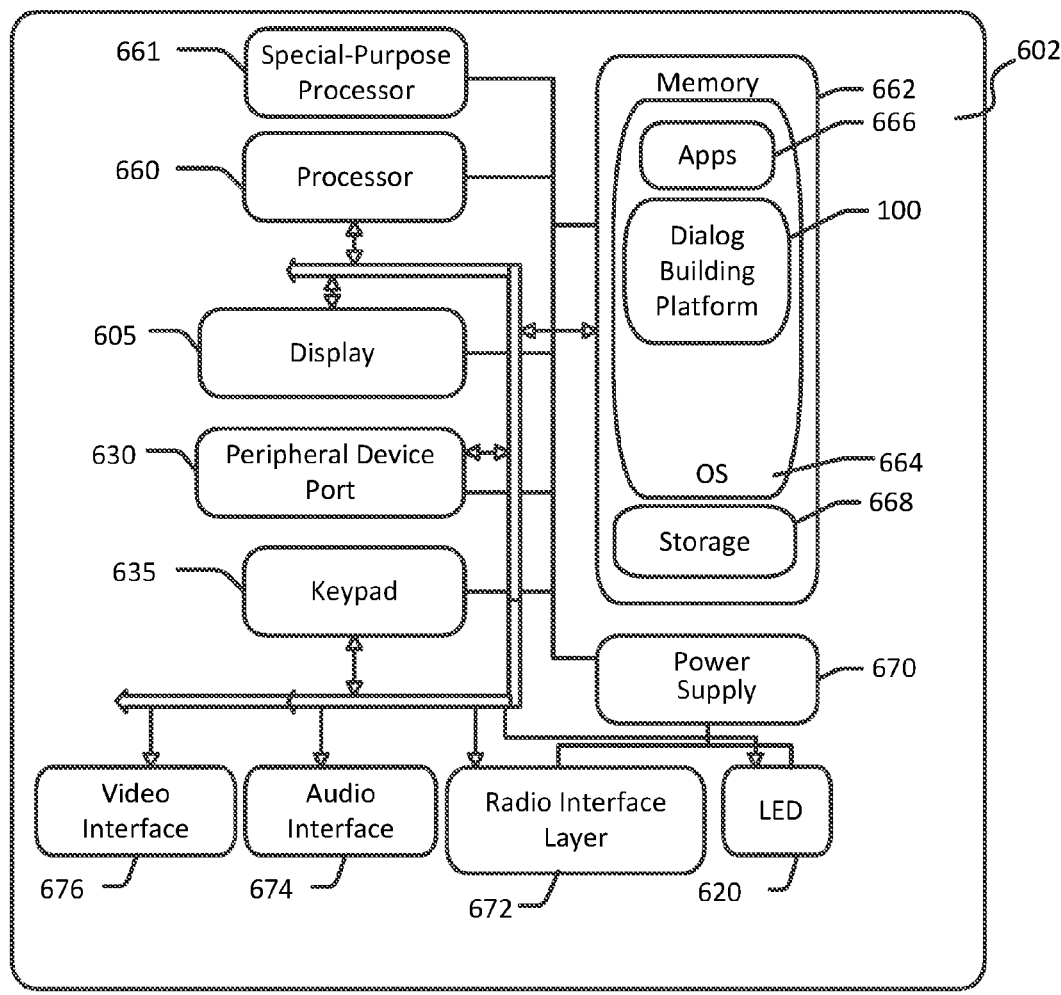
FIG. 6B is a simplified block diagram of the mobile computing device shown in FIG. 10A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or the dialog building platform 100 run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape.

Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
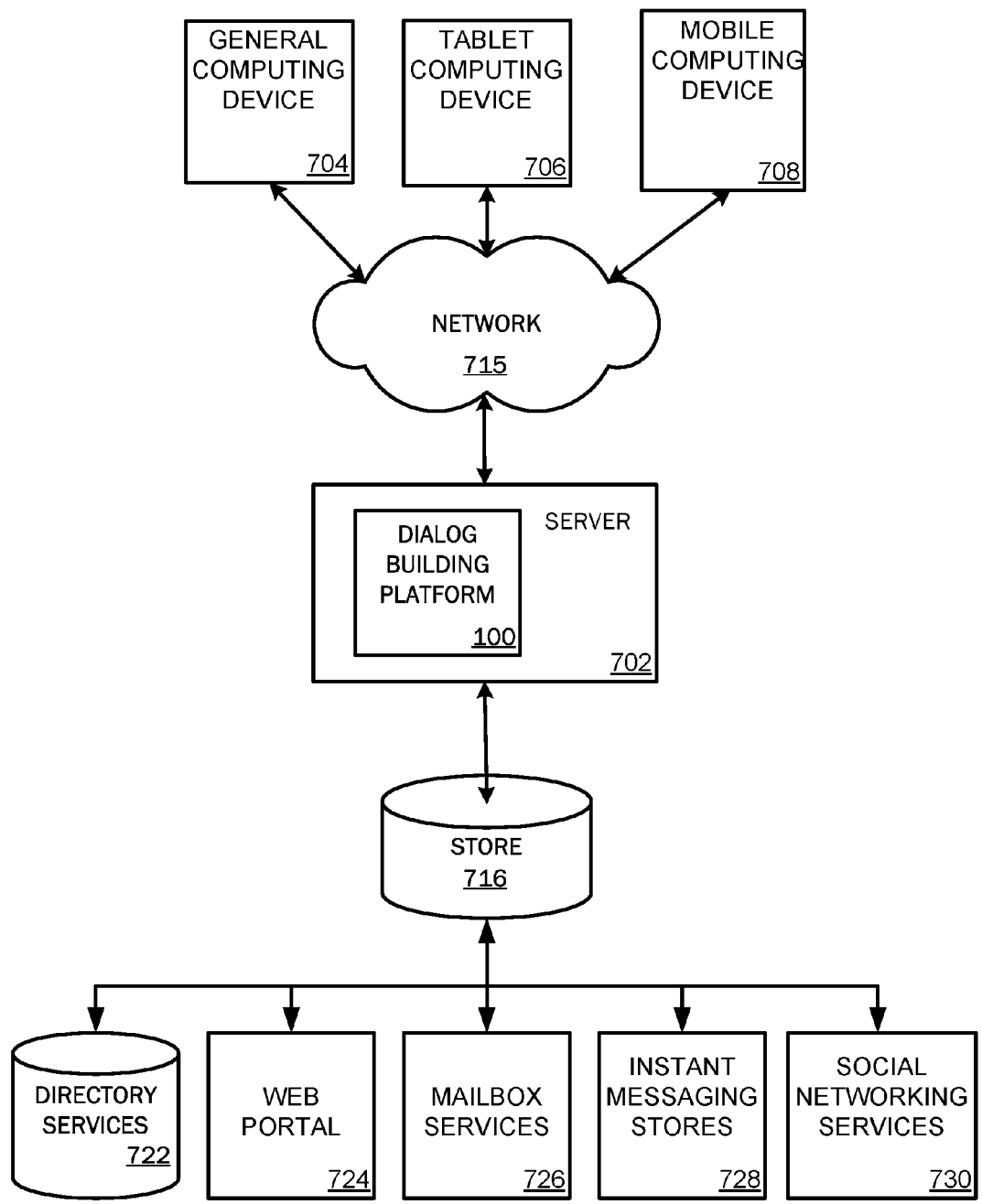
FIG. 7 is a simplified block diagram of a distributed computing system in which various aspects of the disclosure may be practiced.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. By way of example, the dialog building platform 100 may be implemented in a general computing device 704, a tablet computing device 706 and/or a mobile computing device 708 (e.g., a smart phone). In some aspects, the server 702 is configured to implement a dialog building platform 100, via the network 715 as illustrated in FIG. 7.

Figure 8:
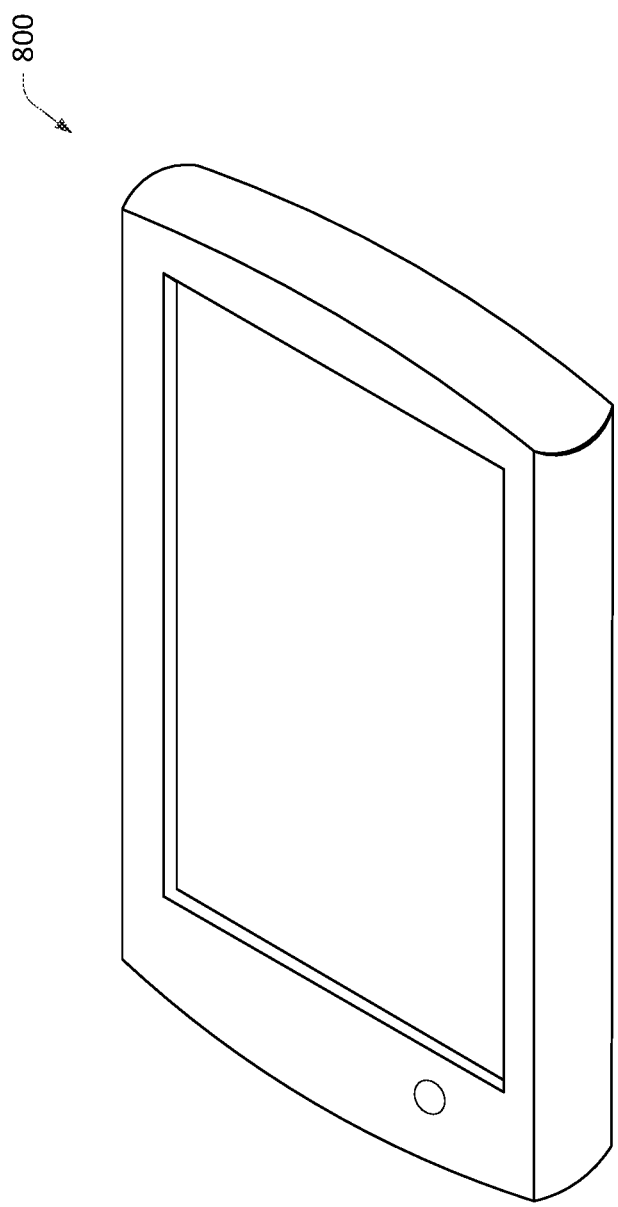
FIG. 8 illustrates a tablet computing device with which various aspects of the disclosure may be practiced

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In some aspects, a system with a platform for building a dialog-state specific multi-turn contextual language understanding system for an application is provided. The system includes at least one processor and a memory. The memory encodes computer executable instruction that, when executed by the at least one processor, are operative to:
  receive information from a builder for building a single-shot language understanding model;
  configure the single-shot language understanding model based on the information;
  constrain a decoding of the single-shot language understanding model to output only dialog-state specific slots and dialog-state specific entities for each determined dialog-state based on a dialog-state dependent semantic schema; and
  implement a constrained single-shot language understanding model to form the dialog-state specific multi-turn contextual language understanding system.

The at least one processor may be further operative to infer the dialog-state dependent semantic schema for different dialog-states based on the single-shot language understanding model and a schema for the single-shot language understanding model. The at least one processor may further be operative to provide a capability to infer the dialog-state dependent semantic schema for different dialog-states based on the single-shot language understanding model and based on user input received by the dialog-state specific multi-turn contextual language understanding system from a dialog with a user and a system prompt given for the dialog or a task. The at least one processor may further be operative to receive a task definition for the application from the builder. The single-shot language understanding model may be built for a task of the task definition. The information may include parameters, slots, and entities necessary to define a task. In these aspects, the single-shot language understanding model is a machine learned model. The system may be a server.

In other aspects, the system with a platform is for building a dialog-state specific multi-turn contextual language understanding system for an application. The system includes at least one processor and a memory. The memory encodes computer executable instruction that, when executed by the at least one processor, are operative to:
  receive information from a builder for authoring single-shot rules;
  form the single-shot rules based on the information;
  infer a dialog-state dependent semantic schema for different dialog states based on the single-shot rules;
  derive dialog-state dependent rules for the different dialog states based on the single-shot rules and the dialog-state dependent semantic schema; and
  implement the dialog-state dependent rules to form the dialog-state specific multi-turn contextual language understanding system.

The at least one processor may further be operative to receive a task definition for the application from the builder. The single-shot rules may be for a task of the task definition. The information may include parameters, slots, and/or entities. The at least one processor may further be operative to implement the dialog-state dependent rules to form the dialog-state specific multi-turn contextual language understanding system in response to receiving an implementation request from the builder. The application may be:
  a digital assistant application;
  a voice recognition application;
  an email application;
  a social networking application;
  a collaboration application;
  an enterprise management application;
  a messaging application;
  a word processing application;
  a spreadsheet application;
  a database application;
  a presentation application;
  a contacts application;
  a gaming application;
  an e-commerce application;
  an e-business application;

a transactional application;
a device control application;
a web interface application;
an exchange application; and/or
a calendaring application.

The at least one processor may further be operative to run a simulation of the dialog-state dependent rules in response to receiving a simulation request from the builder.

In further aspects the system with a platform is for building a dialog-state specific multi-turn contextual language understanding system for an application. The system includes at least one processor and a memory. The memory encodes computer executable instruction that, when executed by the at least one processor, are operative to:
- receive information from a builder for authoring single-shot rules;
- form the single-shot rules based on the information;
- provide a capability to infer a dialog-state dependent semantic schema for different dialog states based on the single-shot rules and based on user input from a dialog with a user during decoding to form a first provided capability;
- provide a capability to derive dialog-state dependent rules based on the dialog-state dependent semantic schema, the single-shot rules, and the user input from the dialog with the user during the decoding to form a second provided capability; and
- implement the single-shot rules, the first provided capability, and the second provided capability to form the dialog-state specific multi-turn contextual language understanding system.

The at least one processor may further be operative to receive a task definition for the application from the builder. The single-shot rules may be for a task of the task definition. The information may include parameters, slots, and/or entities.

In other aspects, the system with a platform is for building a dialog-state specific multi-turn contextual language understanding system for an application. The system includes at least one processor and a memory. The memory encodes computer executable instruction that, when executed by the at least one processor, are operative to:
- receive information from a builder for authoring a combined single-shot language understanding system based on a combination of a machine learned single-shot model and single-shot rules;
- form the combined single-shot language understanding system based on the information, wherein the combined single-shot language understanding system includes a machine learned single-shot language understanding model and a the single-shot rules;
- adapt the combined single-shot language understanding system for dialog-state dependent decoding to form an adapted combined single-shot language understanding model; and
- implement the adapted combined single-shot language understanding model to form the dialog-state specific multi-turn contextual language understanding system.

The combined single-shot language understanding system for dialog-state dependent decoding may be adapted by:
- constraining a decoding of the machine learned single-shot language understanding model to output only dialog-state specific slots and dialog-state specific entities for at least one determined dialog-state based on a dialog-state dependent semantic schema; and
- processing the single-shot rules and the dialog-state dependent semantic schema to derive or to provide a capability to derive dialog-state dependent rules to tag dialog-state specific slots and dialog-state specific entities for the at least one determined dialog-state or another determined dialog-state.

The at least one processor may further be operative to infer the dialog-state dependent semantic schema for different dialog-states based on the information and to derive the dialog-state dependent rules. The at least one processor may further be operative to provide a capability to infer the dialog-state dependent semantic schema for different dialog-states based on the single-shot rules or the machine learned single-shot language understanding model, and based on received user input by the dialog-state specific multi-turn contextual language understanding system from a dialog with a user during the decoding. The at least one processor may further be operative to provide the capability to derive the dialog-state dependent rules.

Yet another aspect of the disclosure includes a method for a dialog-state specific multi-turn contextual language understanding system for an application. The method includes:
- receiving information from a builder for building a single-shot language understanding model;
- configuring the single-shot language understanding model based on the information;
- constraining a decoding of the single-shot language understanding model to output only dialog-state specific slots and dialog-state specific entities for each determined dialog-state based on a dialog-state dependent semantic schema; and
- implementing a constrained single-shot language understanding model to form the dialog-state specific multi-turn contextual language understanding system.

Yet another aspect of the disclosure includes a method for a dialog-state specific multi-turn contextual language understanding system for an application. The method includes:
- receiving information from a builder for authoring single-shot rules;
- forming the single-shot rules based on the information;
- inferring a dialog-state dependent semantic schema for different dialog states based on the single-shot rules;
- deriving dialog-state dependent rules for the different dialog states based on the single-shot rules and the dialog-state dependent semantic schema; and
- implementing the dialog-state dependent rules to form the dialog-state specific multi-turn contextual language understanding system.

A further aspect of the disclosure includes a method for a dialog-state specific multi-turn contextual language understanding system for an application. The method includes:
- receiving information from a builder for authoring single-shot rules;
- forming the single-shot rules based on the information;
- providing a capability to infer a dialog-state dependent semantic schema for different dialog states based on the single-shot rules and based on user input from a dialog with a user during decoding to form a first provided capability;
- providing a capability to derive dialog-state dependent rules based on the dialog-state dependent semantic schema, the single-shot rules, and the user input from the dialog with the user during the decoding to form a second provided capability; and
- implementing the single-shot rules, the first provided capability, and the second provided capability to form the dialog-state specific multi-turn contextual language understanding system.

An additional aspect of the disclosure includes a method for a dialog-state specific multi-turn contextual language understanding system for an application. The method includes:

receiving information from a builder for authoring a combined single-shot language understanding system based on a combination of a machine learned single-shot model and single-shot rules;

forming the combined single-shot language understanding system based on the information, wherein the combined single-shot language understanding system includes a machine learned single-shot language understanding model and a the single-shot rules;

adapting the combined single-shot language understanding system for dialog-state dependent decoding to form an adapted combined single-shot language understanding model; and implementing the adapted combined single-shot language understanding model to form the dialog-state specific multi-turn contextual language understanding system.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various embodiments disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system with a platform for building a dialog-state specific multi-turn contextual language understanding system for an application, the system comprising:
at least one processor; and
a memory for storing and encoding computer executable instructions that, when executed by the at least one processor is operative to:
receive information from a builder for authoring single-shot rules, wherein the information includes any slots and entities necessary for performing a task in one turn of a dialog;
form the single-shot rules based on the information;
infer a dialog-state dependent semantic schema for different dialog states based on the single-shot rules;
derive dialog-state dependent rules for the different dialog states based on the single-shot rules and the dialog-state dependent semantic schema; and
implement the dialog-state dependent rules to form the dialog-state specific multi-turn contextual language understanding system; and
analyze a received utterance from a user with the multi-turn contextual language understanding system.

2. The system of claim 1, wherein the at least one processor is further operative to receive a task definition for the application from the builder, wherein the single-shot rules are for the task.

3. The system of claim 1, wherein the information further includes parameters.

4. The system of claim 1, wherein the at least one processor is further operative to implement the dialog-state dependent rules to form the dialog-state specific multi-turn contextual language understanding system in response to receiving an implementation request from the builder.

5. The system of claim 1, wherein the application is at least one of:
a digital assistant application;
a voice recognition application;
an email application;
a social networking application;
a collaboration application;
an enterprise management application;
a messaging application;
a word processing application;
a spreadsheet application;
a database application;
a presentation application;
a contacts application;
a gaming application;
an e-commerce application;
an e-business application;
a transactional application;
a device control application;
a web interface application;
an exchange application; or
a calendaring application.

6. The system of claim 1, wherein the at least one processor is further operative to run a simulation of the dialog-state dependent rules in response to receiving a simulation request from the builder.

7. The system of claim 1, wherein the system is a server.

8. The system of claim 1, wherein the system is a rule-based.

9. A system with a platform for building a dialog-state specific multi-turn contextual language understanding system for an application, the system comprising:
at least one processor; and
a memory for storing and encoding computer executable instructions that, when executed by the at least one processor is operative to:
receive information from a builder for authoring single-shot rules, wherein the information includes any slots and entities necessary for performing a task in one turn of a dialog;
form the single-shot rules based on the information;
provide a capability to infer a dialog-state dependent semantic schema for different dialog states based on the single-shot rules and based on user input from a dialog with a user during decoding to form a first provided capability;

provide a capability to derive dialog-state dependent rules based on the dialog-state dependent semantic schema, the single-shot rules, and the user input from the dialog with the user during the decoding to form a second provided capability; and implement the single-shot rules, the first provided capability, and the second provided capability to form the dialog-state specific multi-turn contextual language understanding system.

10. The system of claim 9, wherein the at least one processor is further operative to receive a task definition for the application from the builder, wherein the single-shot rules is for the task.

11. The system of claim 9, wherein the information further includes parameters.

12. The system of claim 9, wherein the at least one processor is further operative to implement the single-shot rules, the first provided capability, and the second provided capability to form the dialog-state specific multi-turn contextual language understanding system in response to receiving an implementation request from the builder.

13. The system of claim 9, wherein the application is at least one of:
a digital assistant application;
a voice recognition application;
an email application;
a social networking application;
a collaboration application;
an enterprise management application;
a messaging application;
a word processing application;
a spreadsheet application;
a database application;
a presentation application;
a contacts application;
a gaming application;
an e-commerce application;
an e-business application;
a transactional application;
a device control application;
a web interface application;
an exchange application; or
a calendaring application.

14. The system of claim 9, wherein the at least one processor is further operative to run a simulation of the single-shot rules, the first provided capability, and the second provided capability in response to receiving a simulation request from the builder.

15. The system of claim 9, wherein the system is a server.

16. The system of claim 9, wherein the system is a rule-based.

17. A method for building a dialog-state specific multi-turn contextual language understanding system for an application, the method comprising:
receiving information from a builder for authoring single-shot rules, wherein the information includes any slots and entities necessary for performing a task in one turn of a dialog;
forming the single-shot rules based on the information;
providing a capability to infer a dialog-state dependent semantic schema for different dialog states based on the single-shot rules and based on user input from a dialog with a user during decoding to form a first provided capability;
providing a capability to derive dialog-state dependent rules based on the dialog-state dependent semantic schema, the single-shot rules, and the user input from the dialog with the user during the decoding to form a second provided capability; and
implementing the single-shot rules, the first provided capability, and the second provided capability to form the dialog-state specific multi-turn contextual language understanding system.

18. The method of claim 17, wherein the information further includes parameters.

19. The method of claim 17, further comprising:
receiving an implementation request from the builder,
wherein the implementing the single-shot rules, the first provided capability, and the second provided capability to form the dialog-state specific multi-turn contextual language understanding system is performed in response to the implementation request.

20. The method of claim 17, further comprising:
receiving a simulation request from the builder; and
running a simulation of the single-shot rules, the first provided capability, and the second provided capability in response to the simulation request.

* * * * *